Patented Mar. 29, 1927.

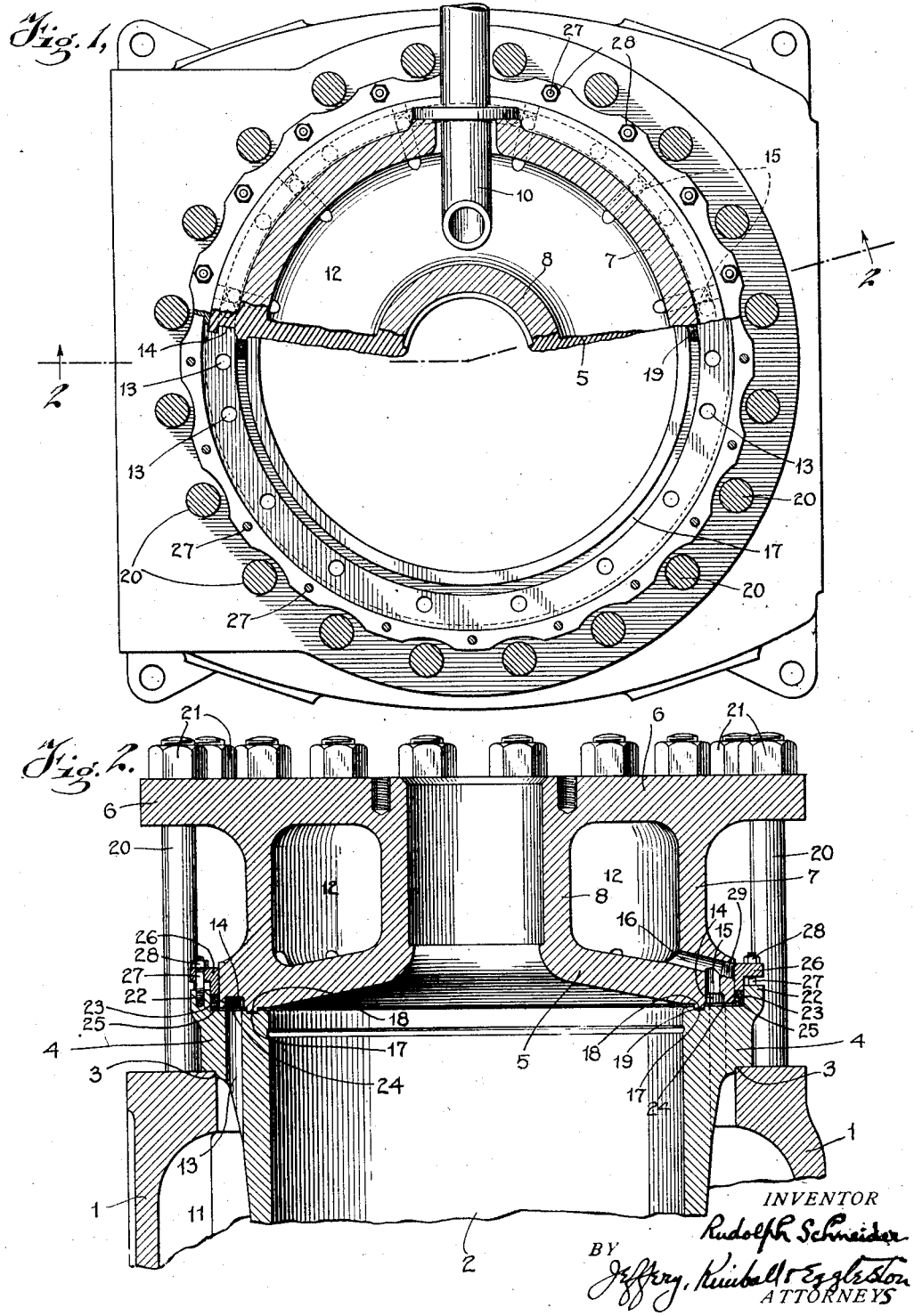

1,622,813

UNITED STATES PATENT OFFICE.

RUDOLPH SCHNEIDER, OF ST. LOUIS, MISSOURI, ASSIGNOR TO BUSCH SULZER BROS.-DIESEL ENGINE CO., OF ST. LOUIS, MISSOURI, A CORPORATION OF MISSOURI.

CYLINDER AND HEAD CONSTRUCTION.

Application filed July 16, 1923. Serial No. 651,746.

My invention is designed primarily as an improvement applicable to symmetrical cylinder heads of the type shown in the patent to Hefti, No. 1,374,079, granted April 5, 1921, in which all or several of the valves are collected and located in a valve cage seated in an axial socket in the cylinder head to be inserted into the same or withdrawn therefrom as a unit, and the invention relates to the means of connecting the water jacket space of such a head to the water space of the cylinder jacket, although the invention is also useful with other kinds of heads as will later appear.

Referring to the drawings:

Fig. 1 is a horizontal section through a part of the cylinder head, containing the improvement, the remainder of the head being broken away to show the upper face of the cylinder and liner in plan, and Fig. 2 is a vertical section on line 2—2, Fig. 1.

Usual modes of connecting the water jackets of engine cylinders and heads are either by exterior piping or by direct connection, through registering holes in the cylinder and head and in the single intervening gasket. Both are unsatisfactory, the piping, because it projects and is in the way, and the other, because it is impracticable except in small engines where the danger and effects of leakage are relatively slight. In my structure, as distinguished from the outside piping type of connection, I locate the passages connecting the water jacket spaces of the cylinder and cylinder head solely in those members themselves and, as distinguished from the registered hole method, I provide two distinct annular joints separately packed, clamped and adjusted, and located respectively on the inner and outer sides of the passages connecting the water space of the cylinder jacket with that of the head. By this means, I am enabled to tighten either joint independently and to provide each with a gasket or packing of suitable character, respectively adapted to the conditions to be met by the joint of which it forms a part. The inner of the two joints, which must prevent leakage of high pressure gases is of hard material capable of resisting the temperatures to which it is subject. The packing of the joint between the water space and the atmosphere is, on the contrary, relatively soft and need not have the same temperature resisting qualities as the gasket used in the other joint. In the new structure also, there is formed in one of the two water-jacketed members, a continuous groove or series of grooves, concentric to the cylinder axis to make the connection with the water-connecting holes in the other member, and this permits the head, which is symmetrical, to be clamped to the cylinder in any position in which the bolt holes register, which is an important advantage in many cases.

The water-jacketed cylinder is illustrated as formed by the outer cylinder casing 1 and the liner 2, which seats thereon by the annular shoulder 3 on its enlarged head 4. Cooperating with the cylinder thus formed, is the cylinder head having a water jacket space formed by the bottom wall 5, the top wall 6, whose extended edge constitutes the bolt flange, the outer side wall 7, and the inner wall 8 constituting the socket for the removable and replaceable axial plug above referred to. The pipe 10 may be understood to represent either an inlet or an outlet to the water space of the head.

The water space 11 of the cylinder jacket is in communication with the water space 12 in the cylinder head by passages wholly within the structures of the cylinder and head. In the present instance, the head 4 of the cylinder liner extends above the end of the outer wall of the cylinder and is provided with a number of passages 13 extending upwards or lengthwise of the cylinder, while the bottom wall of the head is provided with a continuous annular groove 14, or with a series of shorter arcuate grooves, with which the passages 13 communicate, and which in turn are placed in communication with the water space 12 of the head by passages 15, 16, made, for convenience, in two relatively angular parts. At each side of the lengthwise passages 13, are located the respective joints between the cylinder head and the liner, as illustrated, or between the cylinder, however constructed, and the cylinder head. It is preferred to provide a groove 17 in one of the co-acting members, preferably the liner, and a corresponding annular rib 18 on the other member. In this groove is located the gasket 19, which is of hard material relatively resistant to high temperature, being of the sort customarily applied in packing joints subjected to the heat and pressure of combustion gases. This joint is clamped together by the bolts or studs 20, which clamp the cylinder head to the liner and which also, in the present case, clamp the liner to the outer wall of the cylinder. The other joint is designed to prevent leakage from the water space to the atmosphere, and is also annular, and is preferably, though not necessarily, formed between surfaces of the head and the liner. In the construction illustrated, the liner has an annular upstanding shoulder 22, to the inner face, 23, of which is opposed the outer face 24 of the bottom wall 5 of the head. In the space between these surfaces and the top of the liner is located soft packing 25, which may be compressed to the requisite extent by the follower ring 26, which is adjusted and held in place by the small studs 27, set in the top of the rib 22 of the liner and which are provided with nuts 28. These nuts are easily accessible by reason of the elevation of the end of the liner above the end of the jacket casing 1. It will be evident that each of the two joints described may be of the character best suiting it to meet its individual requirements, and that the clamping and adjustment of the said joints is effected separately and independently, so that each may be given that amount of pressure which it needs without unfavorable effect on the other, and indeed without any interference whatever.

The arrangement of the passages 15 in vertical positions and the passages 16 in oblique positions is merely for convenience in boring them. Screw plugs 29 are merely closures for the outer ends of the latter passages.

Claims—

1. In an internal combustion engine, a cylinder and a cylinder head having water jackets in communication by passages within said members, and which cylinder makes with said cylinder head distinct and separately packed and tightened annular joints, respectively within and without the water space for respectively preventing escape of gaseous products to the cooling water and of water to the atmosphere, compression of the inner joint being effected by tightening the cylinder head bolts, and axially adjustable means for compressing the packing of the outer joint.

2. In an internal combustion engine, a cylinder and a cylinder head having water jackets in communication by passages within said members and which cylinder makes with said cylinder head distinct and separately packed and tightened annular joints respectively within and without the water space for respectively preventing escape of gaseous products to the cooling water and of water to the atmosphere, the cylinder head having a projecting flange, cylinder head bolts exterior to both said joints and passing through said flange, compression of the inner joint being effected by tightening the cylinder head bolts, and an axially adjustable ring for compressing the packing of the outer joint.

3. In an internal combustion engine a water-jacketed cylinder, and a water-jacketed cylinder head making joint therewith, said jackets being in communication by passages within said members, a hard gasket interposed between opposed joint-forming faces of said members between the interior of the cylinder and the water space, soft packing interposed between opposed joint-forming faces of said members between the water space and the atmosphere, and separate means movable axially of the cylinder for clamping said gasket and adjusting said packing, whereby both escape of gases from the interior of the cylinder to the water space and escape of water from the water space to the atmosphere is prevented, tightening of either having no effect on the other.

4. In an internal combustion engine a water-jacketed cylinder, and a water-jacketed cylinder head making therewith two independent annular packed joints, one of said members being provided with a continuous groove or channel located between said annular joints and in communication with both water jackets, cylinder head bolts exterior to said joints for clamping said members together at the inner of said joints, and independent axially movable means for tightening the other joint.

5. In an internal combustion engine a water-jacketed cylinder, a water-jacketed cylinder head of the type in which the valves are located in a plug insertable into and removable as a unit from a central socket in the cylinder head surrounded by the water jacket, said cylinder and cylinder head being provided with internal water passages connecting said jackets, one of said members having an extended channel or channels and the other a plurality of longitudinal passages in communication therewith, said cylinder and cylinder head having opposed adjacent surfaces making with each other separate annular joints, packings of different hardness for said respective joints, cylinder head bolts exterior to said joints for clamping said members together and tightening the joint having the harder packing, and separate axially adjustable means for tightening the other joint, said groove and water connections enabling the head to be applied to the cylinder in any position in which the cylinder head bolts and the bolt holes in the cylinder head register.

6. In an internal combustion engine a cylinder having an outer jacket wall and a liner extending above the top of the jacket wall and seating thereon, cylinder head bolts exterior to the liner seat extending up from the end of the jacket wall, and a water-jacketed cylinder head forming separate joints with the proximate surface of the liner, water passages in said liner and cylinder head between said joints placing the respective water jackets in communication, the cylinder head bolts constituting the means for clamping the inner joint, and an axially adjustable ring for independently clamping the outer joint.

7. In an internal combustion engine, a water-jacketed cylinder, and a water-jacketed cylinder head, the water spaces of said cylinder and said cylinder head being in communication by passages within said members, the cylinder having in its end a recess surrounded by an upstanding flange or shoulder and receiving the cylinder head, said head making with the cylinder two joints, an inner joint located between the interior of the cylinder and the water space and formed by transverse surfaces, and an outer joint located between the water space and the atmosphere and formed by opposed surfaces of the periphery of the cylinder head and of the upright flange or shoulder with packing between them, and means for compressing it axially of the cylinder.

In testimony whereof, I have signed this specification.

RUDOLPH SCHNEIDER.